United States Patent
Obara et al.

(10) Patent No.: US 12,491,861 B2
(45) Date of Patent: Dec. 9, 2025

(54) HAULING VEHICLE AND VEHICLE CONTROL SYSTEM

(71) Applicant: Hitachi Construction Machinery Co., Ltd., Tokyo (JP)

(72) Inventors: Hiroki Obara, Tokyo (JP); Masaki Kanai, Tokyo (JP); Mikio Bando, Tokyo (JP); Shinichi Uotsu, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 244 days.

(21) Appl. No.: 18/023,455

(22) PCT Filed: Jan. 25, 2022

(86) PCT No.: PCT/JP2022/002543
§ 371 (c)(1),
(2) Date: Feb. 27, 2023

(87) PCT Pub. No.: WO2022/201827
PCT Pub. Date: Sep. 29, 2022

(65) Prior Publication Data
US 2023/0227021 A1 Jul. 20, 2023

(30) Foreign Application Priority Data
Mar. 26, 2021 (JP) .................. 2021-053395

(51) Int. Cl.
*B60W 20/19* (2016.01)
*B60W 10/08* (2006.01)

(52) U.S. Cl.
CPC ............ *B60W 20/19* (2016.01); *B60W 10/08* (2013.01); *B60W 2300/12* (2013.01); *B60W 2554/80* (2020.02); *B60W 2556/45* (2020.02)

(58) Field of Classification Search
CPC ...... B60W 10/08; B60W 10/06; B60W 20/10; B60W 20/19; B60W 30/18027;
(Continued)

(56) References Cited

U.S. PATENT DOCUMENTS

2017/0160748 A1* 6/2017 Nakagawaa ......... A01B 69/008
2017/0191865 A1* 7/2017 Kvist ..................... B60P 1/283
(Continued)

FOREIGN PATENT DOCUMENTS

JP 3891176 B2 3/2007
JP 2015-94994 A 5/2015
(Continued)

OTHER PUBLICATIONS

English translation of JP 2015094994 (Year: 2015).*
(Continued)

*Primary Examiner* — Brandon Z Willis
(74) *Attorney, Agent, or Firm* — Crowell & Moring LLP

(57) ABSTRACT

A hauling vehicle includes a position detection device, a speed detection device, and a vehicle control device. The vehicle control device acquires a work content of the hauling vehicle corresponding to either hauling or standby based on the position of the hauling vehicle verified with the map information and detected by the position detection device and the speed of the hauling vehicle detected by the speed detection device, and calculates a work progression of a loading operation to the hauling vehicle. The vehicle control device also calculates a period from a predicted time at which the work progression exceeds a predetermined proportion until a predicted time at which the hauling vehicle starts acceleration based on the calculated work progression as an acceleration preparation time. The vehicle control device also drives the power generator to generate electricity
(Continued)

during the acceleration preparation time based on the calculated acceleration preparation time.

6 Claims, 12 Drawing Sheets

(58) Field of Classification Search
CPC ......... B60W 30/18054; B60W 30/188; B60W 2050/0002; B60W 2050/0075; B60W 2050/0095; B60W 50/0097; B60W 60/00256; B60W 60/0027; B60W 60/00272; B60W 2300/12; B60W 2300/125; B60W 2300/128; B60W 2300/17; B60W 2520/10; B60W 2530/10; B60W 2554/4042; B60W 2554/80; B60W 2554/802; B60W 2554/804; B60W 2556/45; B60W 2556/50; B60W 2710/086; B60W 2710/08; B60W 2710/082; B60W 2720/106; B60K 6/46; G05D 1/0088; G05D 1/02; G05D 1/0223; G05D 1/644; G05D 1/656; G05D 1/667
See application file for complete search history.

(56) References Cited

U.S. PATENT DOCUMENTS

| | | | | |
|---|---|---|---|---|
| 2018/0347479 A1* | 12/2018 | Nakamura | ............ | F02D 41/021 |
| 2020/0017313 A1* | 1/2020 | Mori | .................... | B65G 47/642 |
| 2021/0395978 A1* | 12/2021 | Takaoka | .................. | E02F 9/205 |
| 2022/0041162 A1* | 2/2022 | Arita | ................... | B60W 30/162 |

FOREIGN PATENT DOCUMENTS

| | | | | |
|---|---|---|---|---|
| JP | 2015094994 A | * | 5/2015 | .......... G05D 1/0257 |
| JP | 2017-89505 A | | 5/2017 | |

OTHER PUBLICATIONS

International Search Report (PCT/ISA/210) issued in PCT Application No. PCT/JP2022/002543 dated Mar. 15, 2022 with English translation (four (4) pages).

Japanese-language Written Opinion (PCT/ISA/237) issued in PCT Application No. PCT/JP2022/002543 dated Mar. 15, 2022 (three (3) pages).

Australian Office Action issued in Australian Application No. 2022244547 dated Feb. 26, 2024 (9 pages).

* cited by examiner

Fig. 4

| Node ID | Traveling Section ID | Node Information | Speed Limit | Inclination | Work Content |
|---|---|---|---|---|---|
| 1 | 1 | $(X_1, Y_1)$ | $V_1$ | $\theta_1$ | Hauling |
| 2 | 1 | $(X_2, Y_2)$ | $V_2$ | $\theta_2$ | Standby |
| 3 | 2 | $(X_3, Y_3)$ | $V_3$ | $\theta_3$ | Standby |
| ... | ... | ... | ... | ... | |
| n | m | $(X_n, Y_n)$ | $V_n$ | $\theta_n$ | Hauling or Standby |
| ... | ... | ... | ... | ... | |

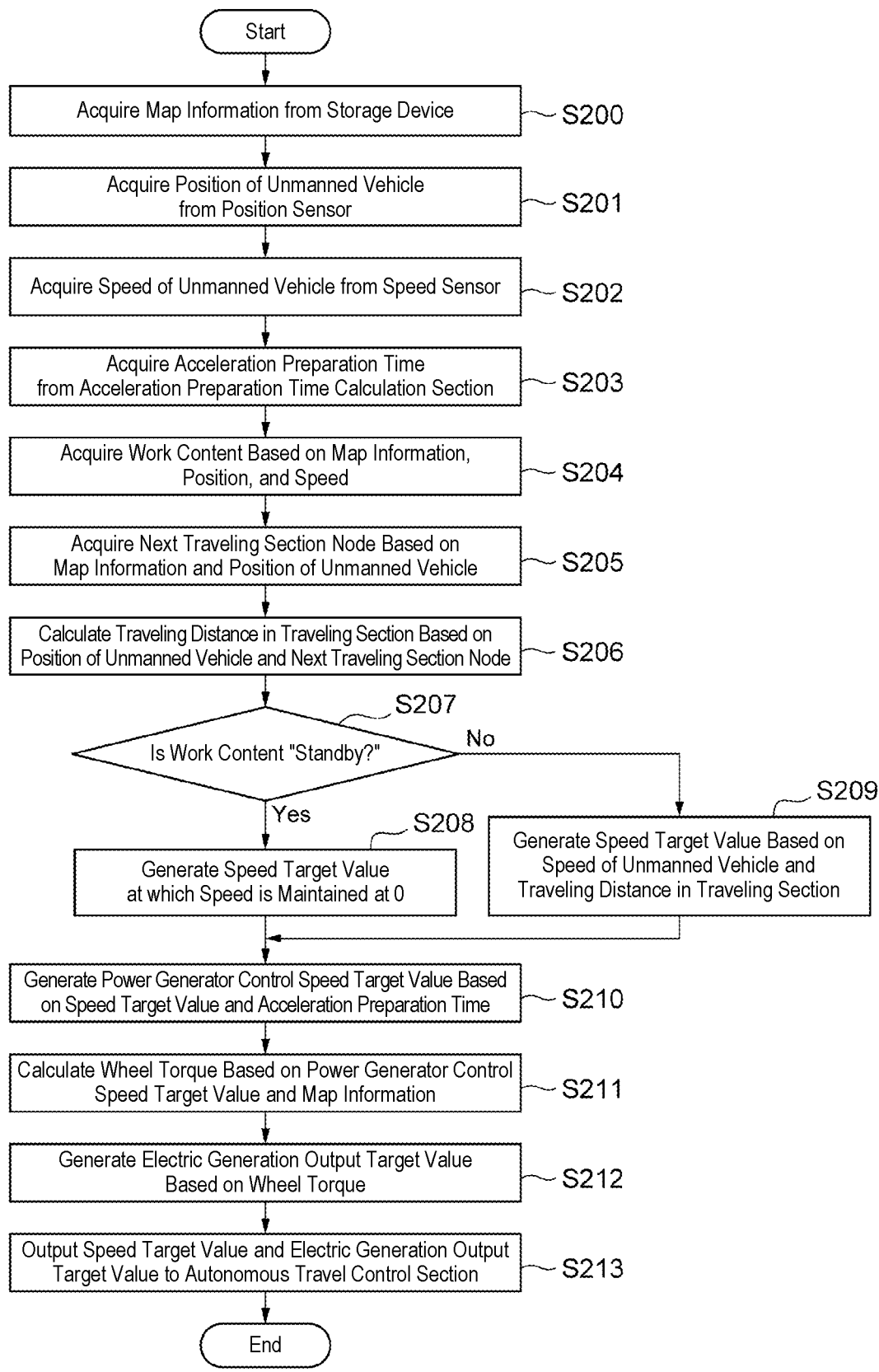

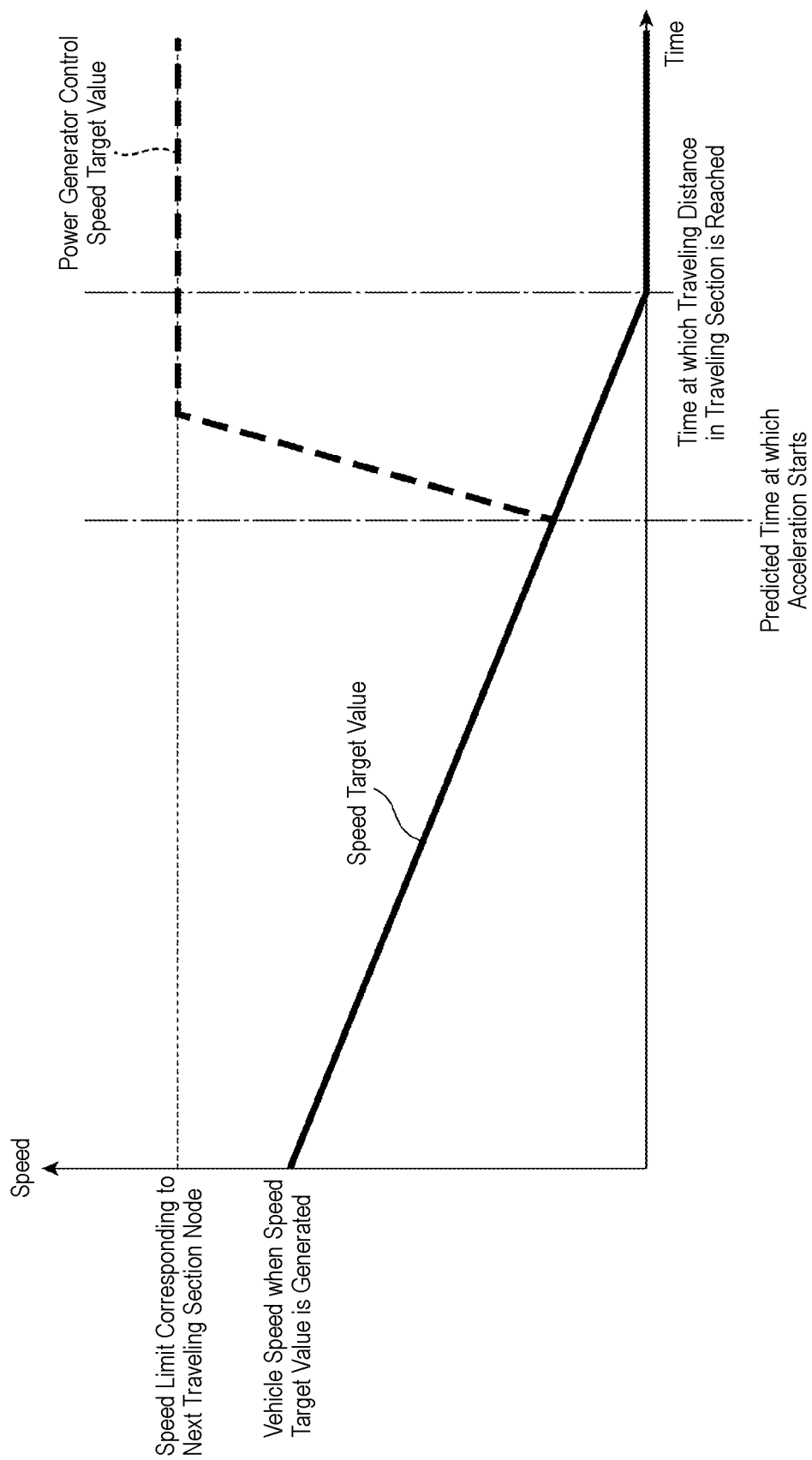

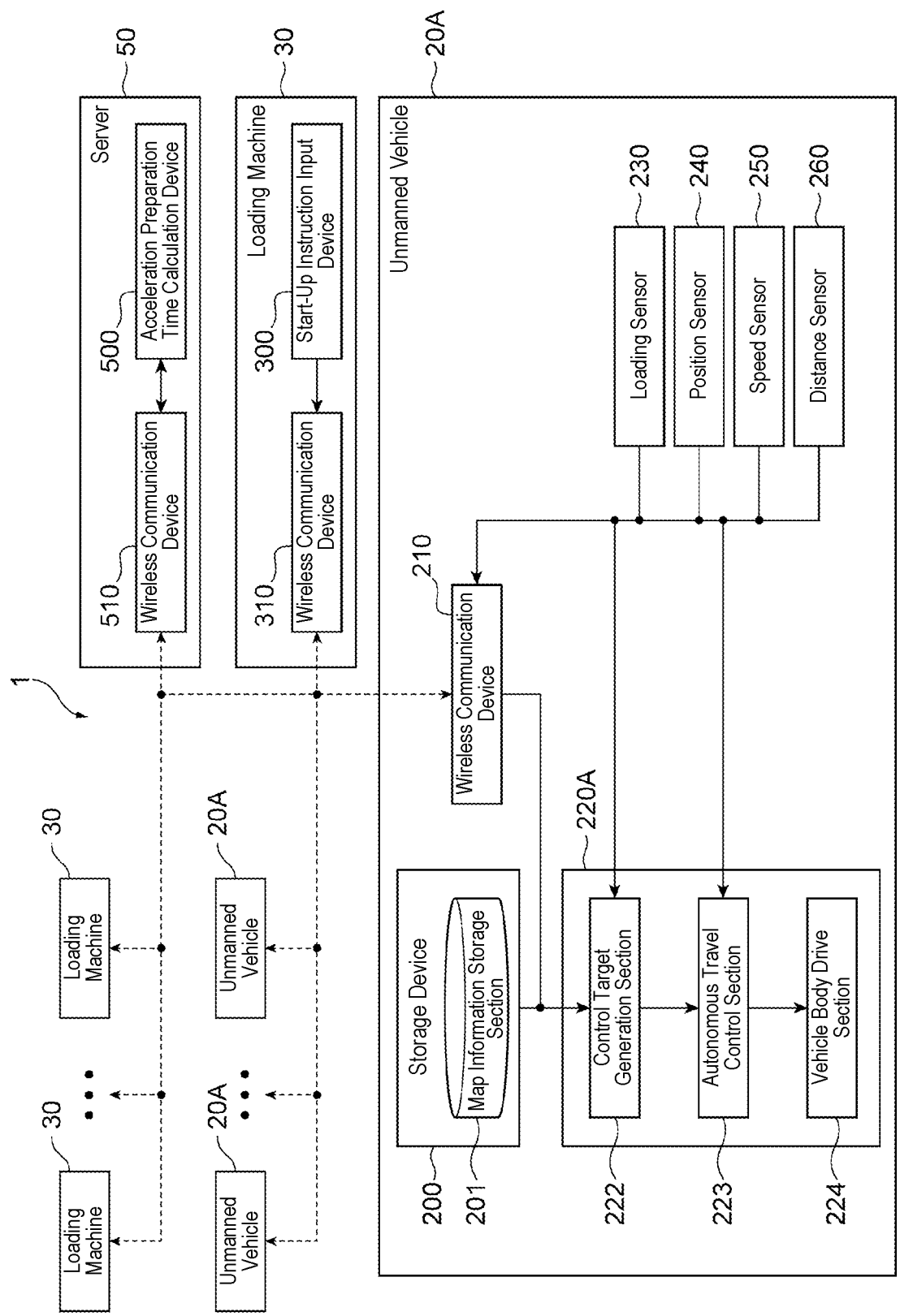

HAULING VEHICLE AND VEHICLE CONTROL SYSTEM

TECHNICAL FIELD

The present invention relates to a hauling vehicle and a vehicle control system and especially relates to a hauling vehicle and a vehicle control system applied to, for example, a strip mine.

The present application claims priority from Japanese patent application JP 2021-053395 filed on Mar. 26, 2021, the entire content of which is hereby incorporated by reference into this application.

BACKGROUND ART

In a strip mine and the like, there has been known a vehicle control system that includes an unmanned vehicle (hauling vehicle) that performs autonomous travel without ride of an operator and a control station that communicates with an unmanned vehicle via a wireless communication line. Generally, the unmanned vehicle employs a series hybrid method in which an electric motor receives electric power generated by an engine (power generator) to drive wheels. In the method, the power generator is controlled such that an amount of power generation is suppressed to be low during deceleration and vehicle stops and suppresses fuel consumption to improve fuel efficiency. However, in a case where speed control that detects an accelerator operation and starts generating electric power required for acceleration is performed, time is required until sufficient acceleration performance can be provided. In view of this, the acceleration performance is poor during acceleration after deceleration or at starting up, and this causes a problem of a decrease in productivity.

To solve the problem, for example, application of a motor output control device for a motor four-wheel drive vehicle described in Patent Literature 1 to the unmanned vehicle is examined. When an acceleration operation by an operator is predicted, the motor output control device described in Patent Literature 1 sets a power generator to be in a state in which electric generation output can be performed, and when the acceleration operation is detected, electric power supply to the electric motor starts. Therefore, for example, when the operator detects release of a brake, the power generator is caused to standby in the state in which electric generation output can be performed, and when the acceleration operation by the operator is detected, electric power is supplied to the electric motor, thus allowing improving the acceleration performance at starting up.

CITATION LIST

Patent Literature

Patent Literature 1: JP 3891176 B

SUMMARY OF INVENTION

Technical Problem

However, in the motor output control device described in Patent Literature 1, since the electric generation time depends on the operation by the operator, the following problem additionally occurs. That is, for example, in a situation where a timing at which the unmanned vehicle starts up cannot be grasped until an instruction is issued from a hydraulic excavator as in a loading operation to the unmanned vehicle by the hydraulic excavator (loading machine), or in a situation where a preceding vehicle in stop is present ahead of the unmanned vehicle and a timing at which the unmanned vehicle starts up cannot be grasped until the preceding vehicle starts up, since the electric generation time until sufficient acceleration performance can be provided cannot be ensured, and therefore it is difficult to achieve improvement in acceleration performance.

The present invention has been made to solve the technical problem, and an object of the present invention is to provide a hauling vehicle and a vehicle control system that allow achieving improvement in acceleration performance.

Solution to Problem

A hauling vehicle according to the present invention is a hauling vehicle that drives an electric motor by electric power generated in a power generator to travel by driving of the electric motor. The hauling vehicle comprises a position detection device, a speed detection device, and a vehicle control device. The position detection device detects a position of the hauling vehicle. The speed detection device detects a speed of the hauling vehicle. The vehicle control device controls the hauling vehicle based on map information set in advance. The vehicle control device: calculates a work progression of a loading operation to the hauling vehicle by a loading machine or a work progression of a preceding vehicle that travels ahead of the hauling vehicle based on the position of the hauling vehicle verified with the map information and detected by the position detection device and the speed of the hauling vehicle detected by the speed detection device; calculates a period from a predicted time at which the work progression exceeds a predetermined proportion until a predicted time at which the hauling vehicle starts acceleration based on the calculated work progression as an acceleration preparation time; and drives the power generator to generate electricity during the acceleration preparation time based on the calculated acceleration preparation time.

In the hauling vehicle according to the present invention, when the acceleration start of the hauling vehicle is affected by the work progression of the loading operation to the hauling vehicle by the loading machine or the work progression of the preceding vehicle, based on the position of the hauling vehicle verified with the map information and detected by the position detection device and the speed of the hauling vehicle detected by the speed detection device, the vehicle control device calculates the work progression of the loading operation or the work progression of the preceding vehicle, calculates the acceleration preparation time based on the calculated work progression, and drives the power generator to generate electricity during the calculated acceleration preparation time. Thus, since electric generation time until the electric motor reaches an output where the sufficient acceleration performance can be provided can be ensured, when acceleration starts, start-up or acceleration of the hauling vehicle can be performed quickly. As a result, improvement in acceleration performance of the hauling vehicle can be achieved.

Advantageous Effects of Invention

The present invention allows achieving improvement in acceleration performance of the hauling vehicle.

BRIEF DESCRIPTION OF DRAWINGS

FIG. 4 is a drawing illustrating a table example of map information.

FIG. 10 is a flowchart depicting process content of a control target generation section.

FIG. 11 is a drawing illustrating a relationship between a speed and a time during speed target value generation.

FIG. 12 is a schematic configuration diagram illustrating a vehicle control system according to an embodiment.

DESCRIPTION OF EMBODIMENTS

Figure 1:
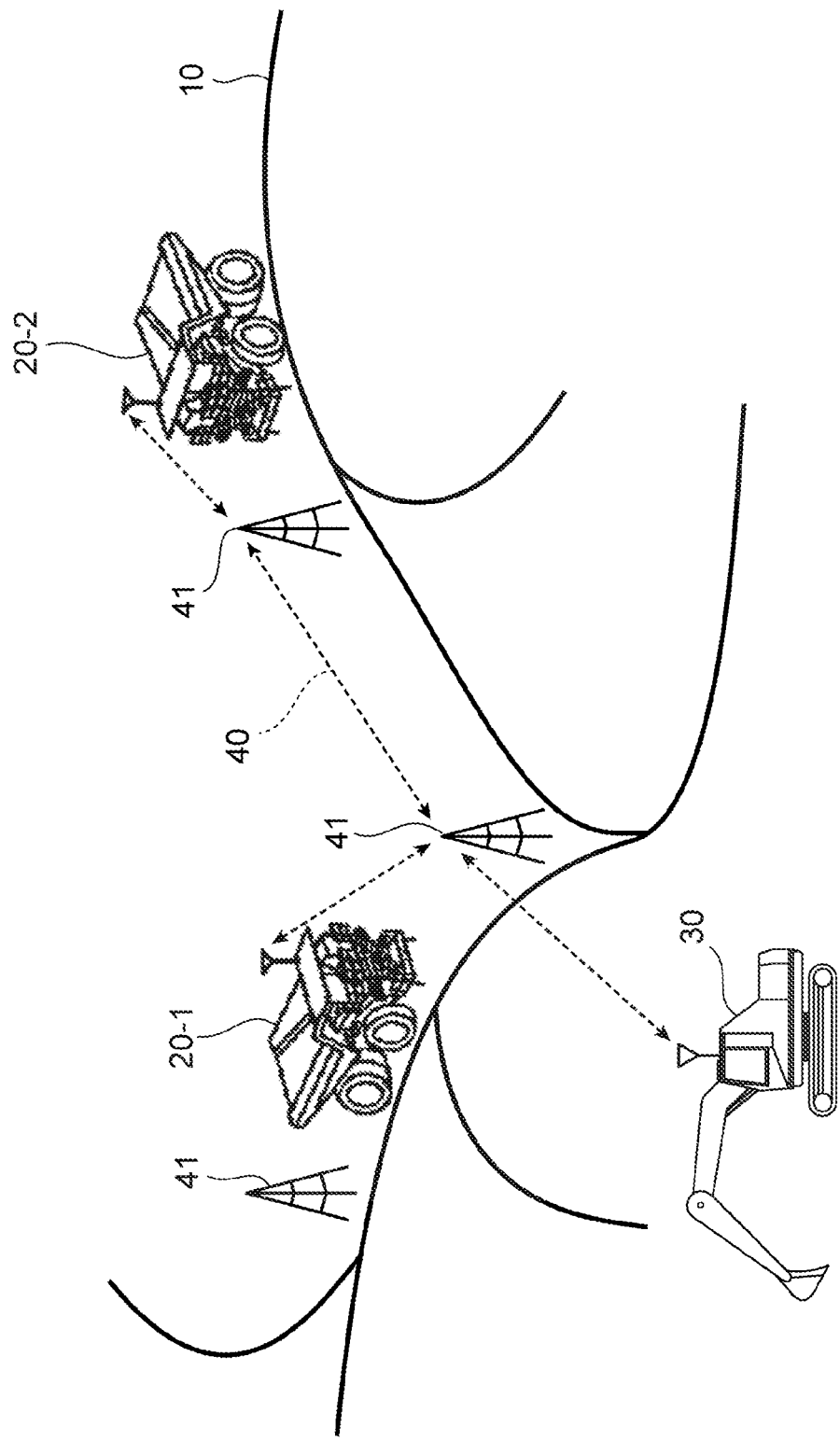
FIG. 1 is a schematic diagram illustrating a work site of a strip mine where unmanned vehicles are used.

The following describes embodiments of a hauling vehicle and a vehicle control system according to the present invention with reference to the drawings. The following description shows specific examples of the content of the present invention, the present invention is not limited to the description, and various changes and modifications by those skilled in the art can be made within the scope of the technical ideas disclosed in the Description. In all the drawings for describing the present invention, same reference numerals are attached to those having the same functions, and their repeated descriptions will be omitted in some cases.

[Hauling Vehicle]

First, an embodiment of the hauling vehicle according to the present invention will be described. In the following description, an example of an unmanned vehicle as a hauling vehicle that can perform autonomous travel in a work site (see FIG. 1) of a strip mine is given, but the hauling vehicle of the present invention may be a vehicle on which an operator boards and steers or a vehicle steered by a remote operation.

As illustrated in FIG. 1, in the work site of the strip mine, one or more loading machines 30, which perform an excavation work and a loading operation, and one or more unmanned vehicles 20 (an unmanned vehicle 20-1, an unmanned vehicle 20-2 . . . ), which hauling, for example, earth and sand and ores loaded from the loading machines 30, work in collaboration. The unmanned vehicles 20 and the loading machines 30 are communicably configured mutually with a wireless communication line 40. Specifically, a plurality of wireless base stations 41 are installed, for example, in a strip mine, and the unmanned vehicles 20 and the loading machines 30 mutually perform transmission and reception via the wireless base stations 41. The unmanned vehicle 20 travels in a feed path 10 set based on, for example, a shape and geography of the work site.

Figure 2:
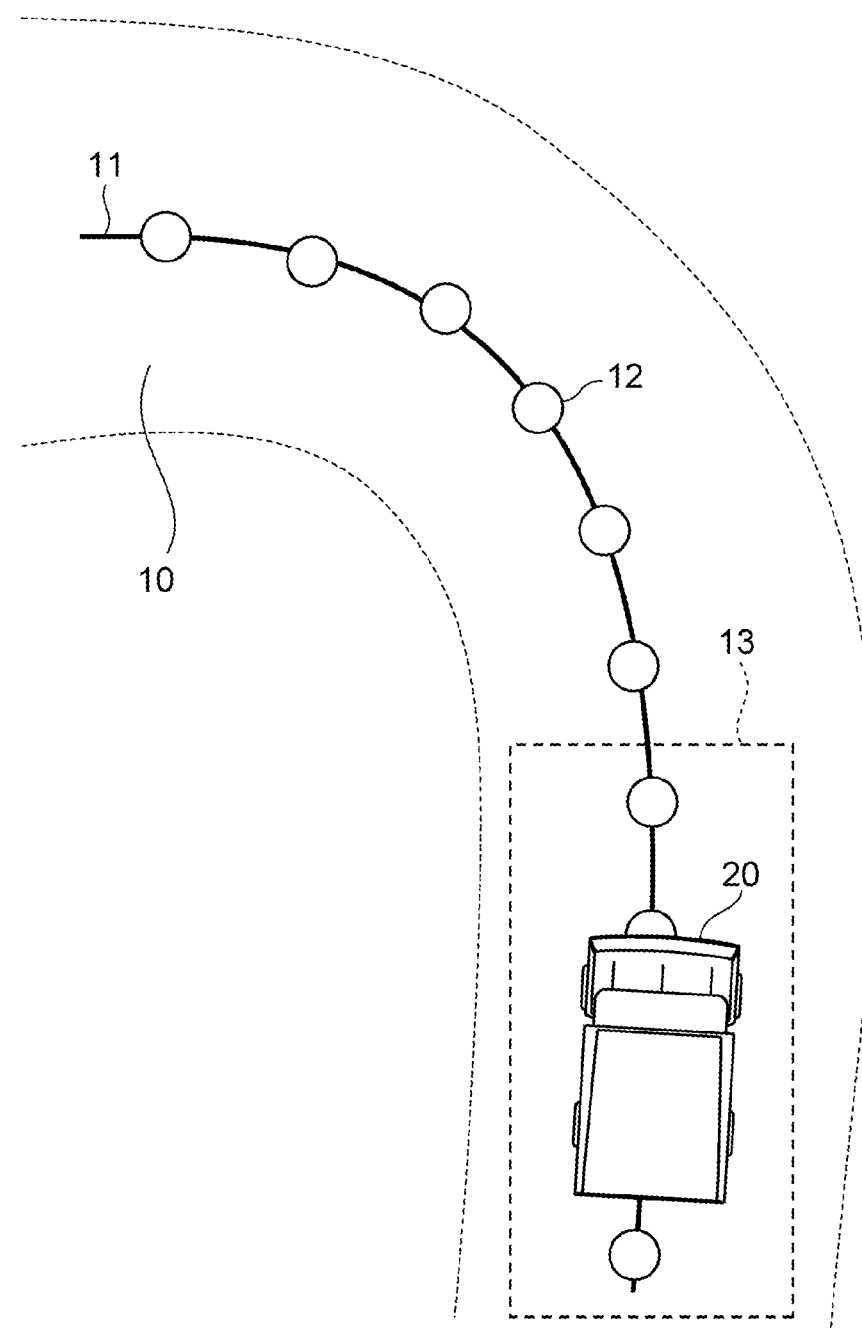
FIG. 2 is a drawing illustrating a state when the unmanned vehicle travels in a feed path.

FIG. 2 is a drawing illustrating a state when the unmanned vehicle travels in the feed path. A travel path 11 illustrated in FIG. 2 is data illustrating a curved line in the feed path 10 and includes a plurality of nodes 12 disposed at predetermined intervals. The nodes 12 are data indicating coordinates on the travel path 11. The unmanned vehicle 20 may perform autonomous travel such that a deviation with the travel path 11 becomes the minimum, or may perform autonomous travel so as to pass through on the nodes 12.

Additionally, a traveling section 13 illustrated in FIG. 2 is a region of dividing the feed path 10 that achieves the autonomous travel in which only one unmanned vehicle 20 is caused to travel in one traveling section 13 and the unmanned vehicles 20 do not interfere with one another. The traveling section 13 may be set to be divided for each of the nodes 12 or may be set to be divided such that the plurality of nodes 12 form one traveling section 13. In this embodiment, the travel path 11 is set as the curved line passing through the center of the feed path 10, and the nodes 12 are set to be located on the travel path 11 at regular intervals.

Figure 3:
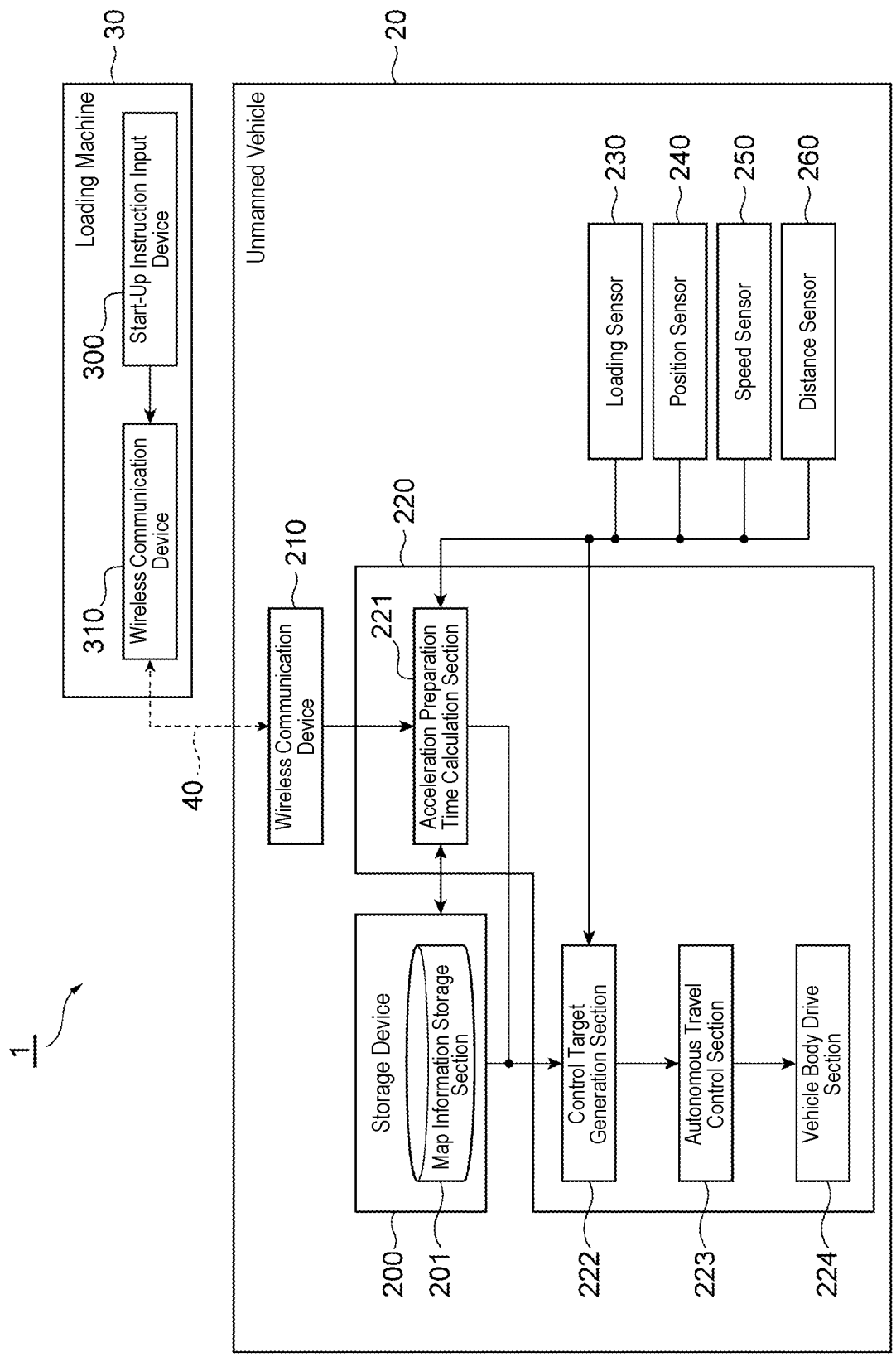
FIG. 3 is a block diagram illustrating the unmanned vehicle according to an embodiment.

FIG. 3 is a block diagram illustrating the unmanned vehicle according to this embodiment. For further ease of understanding of the configuration of the unmanned vehicle 20, FIG. 3 also illustrates the loading machine 30, which performs the collaboration work with the unmanned vehicle 20. While FIG. 3 illustrates each one of the unmanned vehicle 20 and the loading machine 30, they have the similar configurations even when two or more of them are present.

For the loading machine 30, an example of a hydraulic excavator that includes a front work implement turnably disposed in a vertical direction with respect to a body of the loading machine is shown, but the loading machine 30 is not limited to the hydraulic excavator and, for example, may be a wheel loader.

The loading machine 30 includes a start-up instruction input device 300 and a wireless communication device 310 as a hardware configuration. The start-up instruction input device 300 is, for example, a switch that issues a start-up instruction from the loading machine 30 to the unmanned vehicle 20 and is actuated by the operation by the operator of the loading machine 30. The start-up instruction may transmit a signal from the loading machine 30 to the unmanned vehicle 20 via the wireless communication line 40 and may be horn rumbling of the loading machine 30. The wireless communication device 310 is, for example, a radio for connecting to the wireless communication line 40. The loading machine 30 transmits/receives information to/from the unmanned vehicle 20 via the wireless communication device 310.

The unmanned vehicle 20 is, for example, a dump truck that can perform autonomous travel, and includes a vehicle body, a right and left pair of front wheels mounted on the front side of the vehicle body, a right and left pair of rear wheels mounted on the rear side of the vehicle body, and a load body supported to the vehicle body such that the load body can rise and fall. The rear wheel is, for example, a driving wheel, and is driven by a traveling motor (electric motor) mounted on the rear wheel. The traveling motor is, for example, controlled by an inverter, and rotates by receiving electric power generated in a power generator (an engine in this embodiment) built into the vehicle body. Note that the driving wheel may be the front wheel.

Additionally, as illustrated in FIG. 3, the unmanned vehicle 20 includes a storage device 200, a wireless communication device 210, and a vehicle control device 220. Further, to the unmanned vehicle 20, various sensors, such as a loading sensor (loaded amount detection device) 230, a position sensor (position detection device) 240, a speed sensor (speed detection device) 250, and a distance sensor (distance detection device) 260 are mounted.

The storage device 200 is a non-volatile storage medium that allows reading and writing information, and stores an Operating System (OS), various control programs, an application program, a database, and the like. The storage device 200 includes a map information storage section 201. The map information storage section 201 stores, for example, a table of the map information.

The table of the map information at least describes, for example, as illustrated in FIG. 4, a traveling section ID of the traveling section 13 including the node 12, node information including the coordinate of the node 12, a speed limit based on both or any one of a curvature of the travel path 11 and an inclination of the feed path 10, the inclination of the feed path 10, and work content of the unmanned vehicle 20 for each node ID of the node 12. As the work content of the unmanned vehicle 20, "standby" is set to the node 12 at the coordinate where the loading machine 30 performs a loading operation on the unmanned vehicle 20, and "hauling" is set to the nodes 12 other than that.

The wireless communication device 210 is, for example, a radio for connecting to the wireless communication line 40. The unmanned vehicle 20 transmits/receives information to/from the loading machine 30 via the wireless communication device 210.

The vehicle control device 220 controls the entire vehicle of the unmanned vehicle 20. The vehicle control device 220 is configured of a computer formed by, for example, combining a Central Processing Unit (CPU) that performs an operation, a Read Only Memory (ROM) as secondary storage device that records programs for operations, and a Random Access Memory (RAM) as a temporary storage device that stores progression of the operation and a temporal control variable. By executing the stored programs, the respective controls regarding, for example, the traveling and the operation of the unmanned vehicle 20 are performed.

As illustrated in FIG. 3, the vehicle control device 220 includes an acceleration preparation time calculation section 221, a control target generation section 222, an autonomous travel control section 223, and a vehicle body drive section 224. The acceleration preparation time calculation section 221 calculates a work progression of the loading operation to the unmanned vehicle 20 by the loading machine 30 or a work progression of a preceding vehicle (unmanned vehicle) that travels ahead of the unmanned vehicle 20 based on sensor information and calculates an acceleration preparation time of the unmanned vehicle 20 based on the calculated work progression. The acceleration preparation time here is a period from the predicted time at which the work progression of the loading operation to the unmanned vehicle 20 by the loading machine 30 or the work progression of the preceding vehicle that travels ahead of the unmanned vehicle 20 exceeds a predetermined proportion until a predicted time at which the unmanned vehicle 20 starts acceleration. The acceleration preparation time is further divided into "acceleration preparation time during standby" and "acceleration preparation time during hauling." The detailed description will be described later. Note that the predicted time at which the unmanned vehicle 20 starts acceleration is, in other words, the time at which the acceleration is required.

The control target generation section 222 generates a control target based on at least the map information and the acceleration preparation time calculated by the acceleration preparation time calculation section 221. The generated control target at least includes a speed target value and an electric generation output target value. For example, the control target generation section 222 generates the speed target value based on the map information, the position of the unmanned vehicle 20 and the speed of the unmanned vehicle 20, and generates a power generator control speed target value based on the generated speed target value and the acceleration preparation time calculated by the acceleration preparation time calculation section 221. Further, the control target generation section 222 generates the electric generation output target value based on the generated power generator control speed target value and the map information.

The autonomous travel control section 223 generates a control command causing the unmanned vehicle 20 to perform autonomous travel based on the control target generated by the control target generation section 222. The generated control command includes at least one of a brake pedal manipulated variable, an accelerator pedal manipulated variable, a steering angle manipulated variable, or a power generator manipulated variable. For example, the autonomous travel control section 223 generates a power generator manipulated variable to drive the power generator to generate electricity during the acceleration preparation time such that the electric generation output target value can be achieved based on the electric generation output target value generated by the control target generation section 222.

In accordance with the control command generated by the autonomous travel control section 223, the vehicle body drive section 224 performs, for example, a brake operation for braking the unmanned vehicle 20 and an actuation of a steering motor for changing a steering angle of the unmanned vehicle 20, a traveling motor for traveling the unmanned vehicle 20, and the power generator that generates electric power consumed by the traveling motor to cause the unmanned vehicle 20 to travel.

The loading sensor 230 is a device that detects a loaded amount of the unmanned vehicle 20. For example, the loading sensor 230 measures, for example, a load acting on a suspension of the unmanned vehicle 20 and a pressure of hydraulic oil in a hydraulic cylinder to detect the loaded amount of the unmanned vehicle 20.

The position sensor 240 is, for example, a Global Positioning System (GPS) device and detects the position of the unmanned vehicle 20. The detected position of the unmanned vehicle 20 is verified with the map information set in advance.

The speed sensor 250 is, for example, a wheel speed sensor and detects the speed of the unmanned vehicle 20. Here, instead of the speed sensor 250, for example, the vehicle speed may be detected based on a time change in vehicle location information obtained by the GPS device.

The distance sensor 260 detects a distance between the unmanned vehicle 20 and an object (for example, the preceding vehicle) around the unmanned vehicle 20, and may be, for example, a millimeter-wave radar, and may be Light Detection And Ranging (LIDAR). Additionally, instead of the millimeter-wave radar and the LIDAR, the distance may be detected from an image acquired with a stereo camera.

Figure 5:
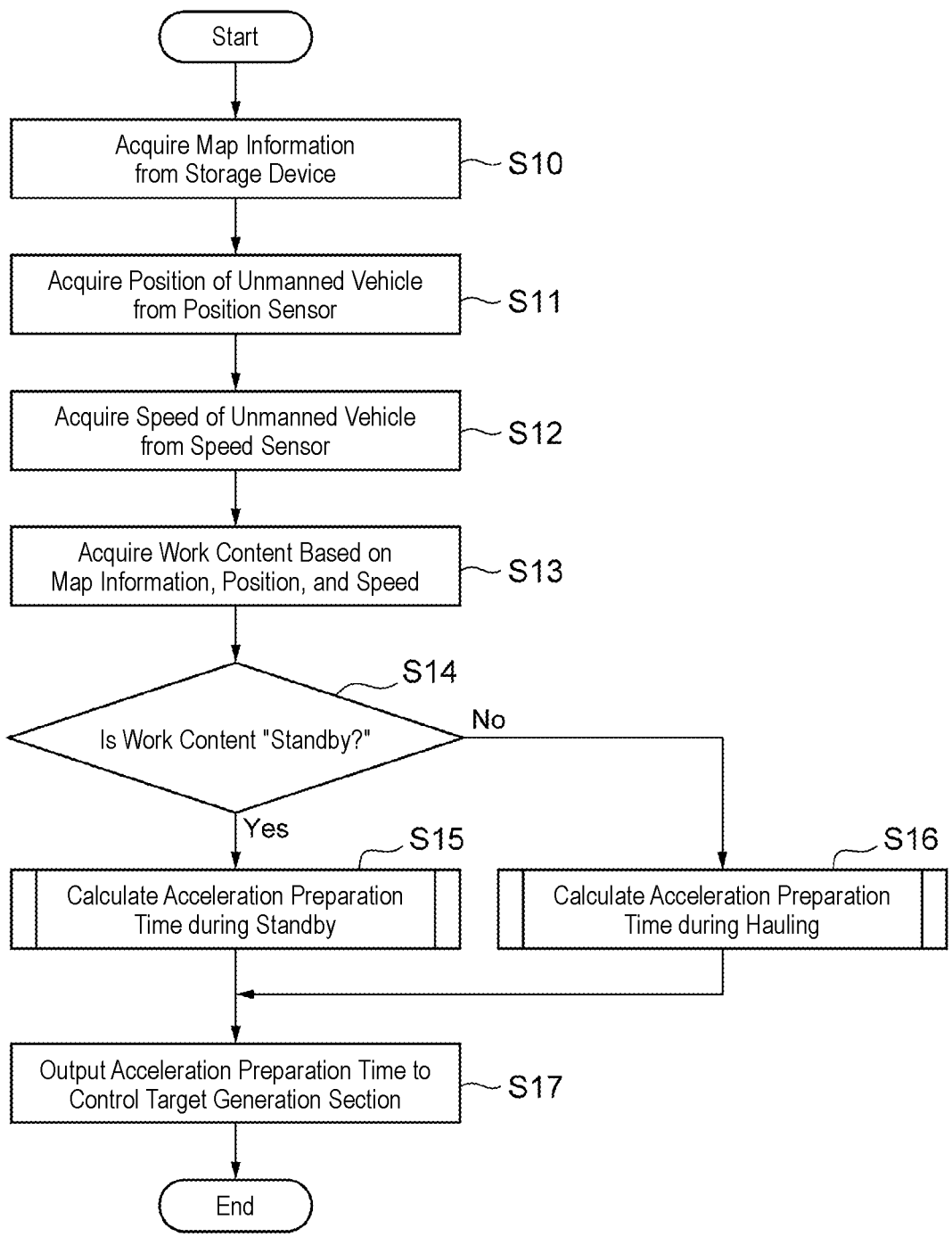
FIG. 5 is a flowchart depicting process content of an acceleration preparation time calculation section.

The following will describe the process content of the acceleration preparation time calculation section 221 based on FIG. 5. FIG. 5 is a flowchart depicting the process content of the acceleration preparation time calculation section.

As depicted in FIG. 5, first, the acceleration preparation time calculation section 221 acquires the above-described map information from the map information storage section 201 in the storage device 200 (Step S10). Subsequently, the acceleration preparation time calculation section 221 acquires the position of the unmanned vehicle 20 from the position sensor 240 and further acquires the speed of the unmanned vehicle 20 from the speed sensor 250 (Steps S11 and S12). Note that the order of acquisition of the map information, acquisition of the position, and acquisition of the speed are not limited the above-described content and may be switched as necessary, and they may be simultaneously acquired in one step.

Subsequently, the acceleration preparation time calculation section 221 acquires the node ID of the node 12 assigned to the unmanned vehicle 20 based on the acquired map information, position of the unmanned vehicle 20, and speed of the unmanned vehicle 20 and acquires the work content of the unmanned vehicle 20 based on the acquired node ID (Step S13). The node ID may be the node ID of the node 12 closest from the position of the unmanned vehicle 20 or may be the node ID of the closest node 12 among the plurality of nodes 12 ahead of the traveling direction of the unmanned vehicle 20. As the work content, the work content associated with the node ID may be acquired, or the work content may be acquired based on the speed of the unmanned vehicle 20. When the work content is acquired based on the speed of the unmanned vehicle 20, for example, in a case where the speed of the unmanned vehicle 20 is not 0, "hauling" is acquired, and in a case where the speed of the unmanned vehicle 20 is 0 and the work content associated with the node ID is "standby," "standby" is acquired.

Subsequently, the acceleration preparation time calculation section 221 determines whether the work content is "standby" (Step S14). When the work content is determined as "standby," the acceleration preparation time calculation section 221 calculates the acceleration preparation time during standby (Step S15). On the other hand, when the work content is determined as not "standby," the acceleration preparation time calculation section 221 calculates the acceleration preparation time during hauling (Step S16). When Step S15 or S16 ends, the acceleration preparation time calculation section 221 outputs the calculated acceleration preparation time (acceleration preparation time during standby or acceleration preparation time during hauling) to the control target generation section 222 (Step S17). Thus, a sequence of the processes are terminated.

Figure 6:
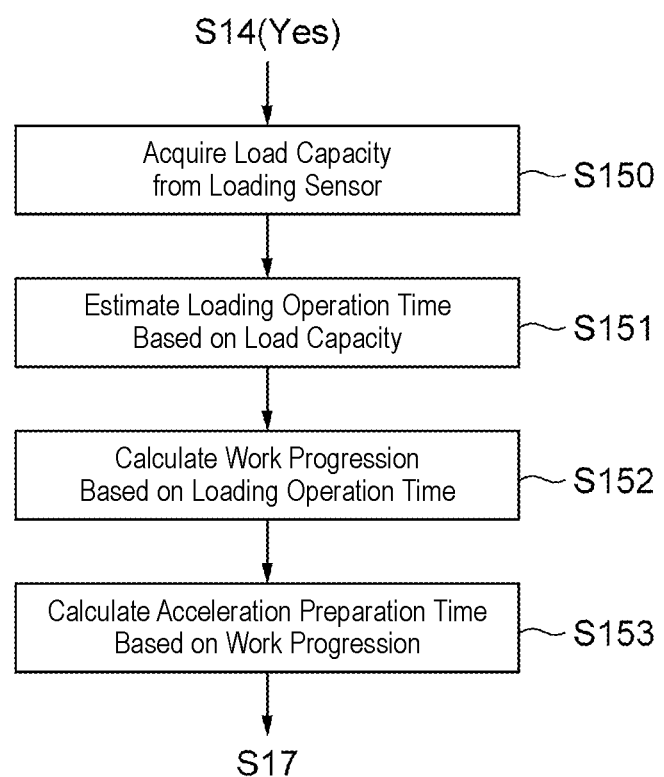
FIG. 6 is a flowchart depicting process content of acceleration preparation time calculation during standby.

Next, using FIG. 6 and FIG. 7, the process content of the acceleration preparation time calculation during standby in Step S15 will be described in detail. FIG. 6 is a flowchart depicting the process content of the acceleration preparation time calculation during standby, and FIG. 7 is a drawing illustrating an example of the time change of loaded amount.

As depicted in FIG. 6, the acceleration preparation time calculation section 221 first acquires the loaded amount from the loading sensor 230 (Step S150). Subsequently, the acceleration preparation time calculation section 221 estimates a loading operation time based on the acquired loaded amount (Step S151). Specifically, the acceleration preparation time calculation section 221 estimates the loading operation time until the loading operation to the unmanned vehicle 20 by the loading machine 30 is completed based on transition relationship (see FIG. 7) of the loaded amount of the unmanned vehicle 20 in standby and on which the loading operation is performed by the loading machine 30.

Figure 7:
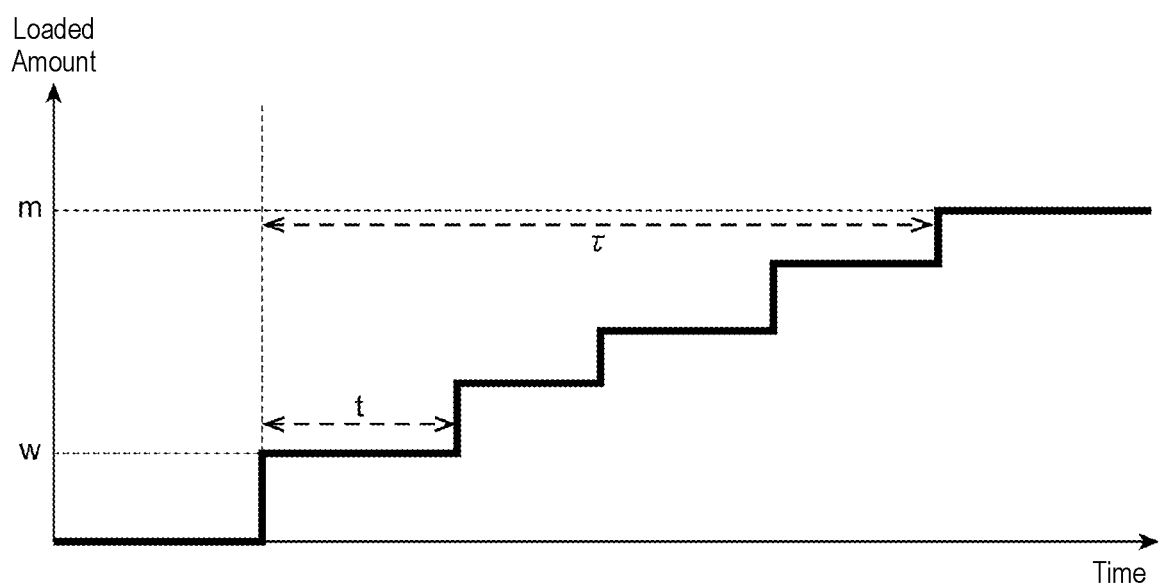
FIG. 7 is a drawing illustrating an example of time change of loaded amount.

FIG. 7 illustrates the time change of the loaded amount of the unmanned vehicle 20 during the loading operation to the unmanned vehicle 20 by the loading machine 30, and it is assumed that the work rate of the loading machine 30 is constant. The horizontal axis indicates the time, and the vertical axis indicates the loaded amount. While FIG. 7 illustrates an example of performing loading five times, the number of loadings is not limited to five times.

The acceleration preparation time calculation section 221 calculates the following formula (1) with a time taken from the start of loading until the maximum load capacity (that is, the maximum load capacity in design) m of the unmanned vehicle 20 is reached as a loading operation time τ based on a time t from the first loading until the second loading and a first loading amount w to estimate the loading operation time.

[Math. 1]

$$\tau = \frac{m}{w} t \qquad (1)$$

Subsequently, the acceleration preparation time calculation section 221 calculates the work progression of the loading operation time based on the estimated loading operation time (Step S152). Specifically, the acceleration preparation time calculation section 221 calculates the proportion obtained by dividing the elapsed time after the loading starts by the estimated loading operation time as the work progression of the loading machine 30.

Subsequently, the acceleration preparation time calculation section 221 calculates the acceleration preparation time based on the calculated work progression (Step S153). Specifically, the acceleration preparation time calculation section 221, for example, calculates an advance rate of the work progression based on the current time and the calculated work progression. Afterwards, the acceleration preparation time calculation section 221 calculates the period from the predicted time at which the work progression exceeds a predetermined proportion (for example, 90%) until the predicted time at which the unmanned vehicle 20 starts acceleration based on the calculated advance rate as the acceleration preparation time. The proportion here is set based on, for example, an accumulated empirical value. The predicted time at which the unmanned vehicle 20 starts acceleration is, for example, calculated based on the current time and the above-described estimated loading operation time τ.

Note that, in Step S151, the acceleration preparation time calculation section 221 may calculate the loading operation time τ using the average value of the loaded amounts when the start-up instruction is received from the loading machine 30 instead of the maximum load capacity m. Additionally, the acceleration preparation time calculation section 221 may use the average value of the elapsed periods from the start of loading until the start-up instruction is received from the loading machine 30 as the loading operation time.

The average value of the loaded amounts when the start-up instruction is received from the loading machine 30 and the average value of the elapsed periods from the start of loading until the start-up instruction is received from the loading machine 30 are, for example, calculated based on the data of the loaded amount or the elapsed time accumulated in the storage device 200, respectively. Note that, to reduce the data amount accumulated in the storage device 200, not all of the data of the loaded amount or the elapsed time for each of the number of hauling is stored, but each of the average value of the loaded amounts and the average value of the elapsed times is calculated at every predetermined period (for example, one day), only the calculated average value data at the predetermined period may be accumulated in the storage device 200, and the average value may be calculated using the accumulated average value.

Additionally, in Step S152, the acceleration preparation time calculation section 221 may use a ratio of the loaded amount to the maximum load capacity as the work progression of the loading operation, and a ratio of the loaded amount to the average value of the loaded amounts when the start-up instruction is received from the loading machine 30 may be used.

Figure 8:
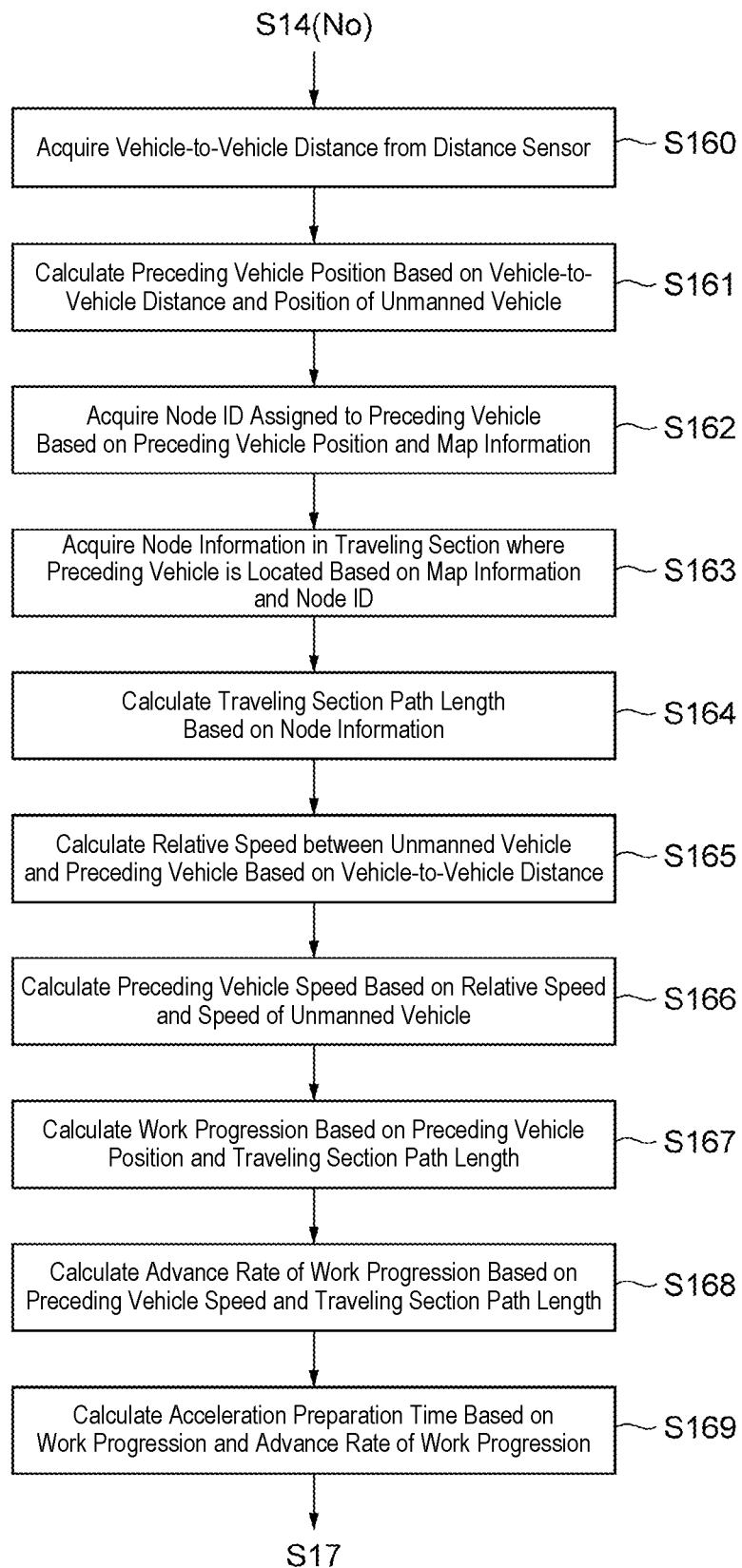
FIG. 8 is a flowchart depicting process content of acceleration preparation time calculation during hauling.
Figure 9:
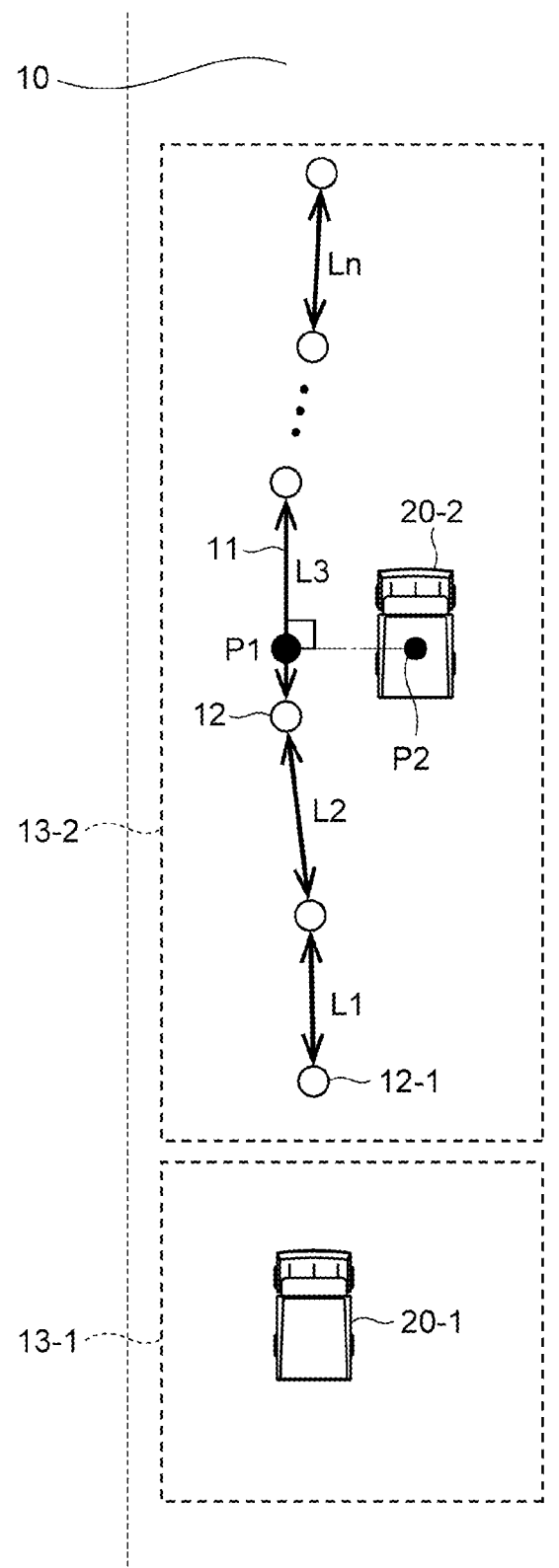
FIG. 9 is a drawing illustrating a state when a preceding vehicle travels in a traveling section.

Next, using FIG. 8 and FIG. 9, the process content of the acceleration preparation time calculation during hauling in Step S16 will be described in detail. FIG. 8 is a flowchart depicting the process content of the acceleration preparation time calculation during hauling, and FIG. 9 is a drawing illustrating a state when the preceding vehicle travels in a traveling section. The process of the acceleration preparation time calculation during hauling depicted in FIG. 8 is performed assuming the situation illustrated in FIG. 9.

In the situation illustrated in FIG. 9, a preceding vehicle (unmanned vehicle 20-2) travels in a traveling section 13-2 ahead of a traveling section 13-1 where the unmanned vehicle 20 (unmanned vehicle 20-1) travels. To avoid an interference between the unmanned vehicles, it is inhibited that the unmanned vehicle 20 enters the traveling section 13-2 until the preceding vehicle exits the traveling section 13-2. At this time, the unmanned vehicle 20 decelerates and travels so as to stop at the near side of the traveling section 13-2.

As depicted in FIG. 8, the acceleration preparation time calculation section 221 first acquires a vehicle-to-vehicle distance between the preceding vehicle located ahead of the traveling direction of the unmanned vehicle 20 and the unmanned vehicle 20 by the distance sensor 260 (Step S160). Subsequently, the acceleration preparation time calculation section 221 calculates the preceding vehicle position based on the acquired vehicle-to-vehicle distance from the preceding vehicle and the position of the unmanned vehicle 20 acquired in Step S11 (Step S161).

Subsequently, the acceleration preparation time calculation section 221 acquires the node ID assigned to the preceding vehicle based on the calculated preceding vehicle position and the map information acquired in Step S10 (Step S162). The node ID may be the node ID of the node 12 closest from the preceding vehicle position, and may be the node ID of the node 12 closest among the plurality of nodes 12 ahead of the preceding vehicle in the traveling direction.

Subsequently, the acceleration preparation time calculation section 221 acquires node information in the traveling section 13-2 where the preceding vehicle is located based on the acquired node ID and the map information acquired in Step S10 (Step S163). At this time, the acceleration preparation time calculation section 221 acquires the node information of all of the nodes 12 having the traveling section IDs corresponding to the acquired node IDs.

Subsequently, the acceleration preparation time calculation section 221 calculates a traveling section path length of the preceding vehicle based on the acquired node information (Step S164). Specifically, as illustrated in FIG. 9, the acceleration preparation time calculation section 221 calculates respective distances L1, L2, . . . Ln between the adjacent nodes 12 from coordinate information included in the node information and further calculates the summed value of the calculated distances as the traveling section path length.

Subsequently, the acceleration preparation time calculation section 221 calculates a relative speed between the unmanned vehicle and the preceding vehicle based on the vehicle-to-vehicle distance acquired in Step S160 (Step S165). Specifically, the acceleration preparation time calculation section 221 calculates the relative speed between the unmanned vehicle 20 and the preceding vehicle based on the time change of the vehicle-to-vehicle distance.

Subsequently, the acceleration preparation time calculation section 221 calculates a preceding vehicle speed based on the calculated relative speed and a speed of the unmanned vehicle 20 acquired in Step S12 (Step S166).

Subsequently, the acceleration preparation time calculation section 221 calculates the work progression of the preceding vehicle based on the preceding vehicle position calculated in Step S161 and the traveling section path length calculated in Step S164 (Step S167). Specifically, first, as illustrated in FIG. 9, the acceleration preparation time calculation section 221 draws a perpendicular line on the travel path 11 from a reference position (for example, a barycentric position of the vehicle) P2 of the preceding vehicle and identifies an intersection point (that is, a foot of the perpendicular line) P1 between the perpendicular line and the travel path 11. Next, the acceleration preparation time calculation section 221 calculates a distance between the identified intersection point P1 and a node 12-1, which is the closest to the unmanned vehicle 20 (unmanned vehicle 20-1) as a traveling distance of the preceding vehicle in the traveling section 13-2. Next, the acceleration preparation time calculation section 221 calculates a proportion acquired by dividing the calculated traveling distance of the preceding vehicle by the traveling section path length (calculated in Step S164) as the work progression of the preceding vehicle.

Subsequently, the acceleration preparation time calculation section 221 calculates an advance rate of the work progression of the preceding vehicle based on the preceding vehicle speed calculated in Step S166 and the traveling section path length calculated in Step S164 (Step S168). Specifically, the acceleration preparation time calculation section 221 calculates the value found by dividing the preceding vehicle speed by the traveling section path length as the advance rate of the work progression.

Subsequently, the acceleration preparation time calculation section 221 calculates the period from the predicted time at which the work progression exceeds a predetermined proportion (for example, 90%) until the predicted time at which the unmanned vehicle 20 starts acceleration as the acceleration preparation time based on the work progression calculated in Step S167 and the advance rate of the work progression calculated in Step S168 (Step S169). The proportion here is set based on, for example, an accumulated empirical value. That is, the predicted time at which the unmanned vehicle 20 starts acceleration is the time when the preceding vehicle exits the traveling section 13-2 ahead of the unmanned vehicle 20, and, for example, is calculated based on the current time and the above-described preceding vehicle speed and traveling section path length.

Note that, in Step S166, the acceleration preparation time calculation section 221 may use a speed limit corresponding to the node 12 assigned to the preceding vehicle as the preceding vehicle speed. Additionally, in Step S169, the acceleration preparation time calculation section 221 may calculate the time when the preceding vehicle exits the traveling section 13-2 ahead of the unmanned vehicle 20 as the acceleration preparation time.

Next, the process content of the control target generation section 222 will be described using FIG. 10. FIG. 10 is a flowchart depicting the process content of the control target generation section.

As depicted in FIG. 10, first, the control target generation section 222 acquires the map information from the map information storage section 201 in the storage device 200 (Step S200). Subsequently, the control target generation section 222 acquires the position of the unmanned vehicle 20 from the position sensor 240 and further acquires the speed of the unmanned vehicle 20 from the speed sensor 250 (Steps S201 and S202). Note that the order of acquisition of the map information, acquisition of the position, and acquisition of the speed is not limited to the above-described content and may be switched as necessary, and they may be simultaneously acquired in one step.

Subsequently, the control target generation section 222 acquires the acceleration preparation time (the acceleration preparation time during standby or the acceleration preparation time during hauling) from the acceleration preparation time calculation section 221 (Step S203).

Subsequently, the control target generation section 222 acquires the node ID of the node 12 assigned to the unmanned vehicle 20 based on the acquired map information, position of the unmanned vehicle 20, and speed of the unmanned vehicle 20 and acquires the work content of the unmanned vehicle 20 based on the acquired node ID (Step S204). The node ID may be the node ID of the node 12 closest from the position of the unmanned vehicle 20 or may be the node ID of the closest node 12 among the plurality of nodes 12 ahead of the traveling direction of the unmanned vehicle 20. As the work content, the work content associated with the node ID may be acquired, or the work content may be acquired based on the speed of the unmanned vehicle 20. When the work content is acquired based on the speed of the unmanned vehicle 20, for example, in a case where the speed of the unmanned vehicle 20 is not 0, "hauling" is acquired, and in a case where the speed of the unmanned vehicle 20 is 0 and the work content associated with the node ID is "standby," "standby" is acquired.

Subsequently, the control target generation section 222 acquires the next traveling section node based on the map information acquired in Step S200 and the position of the unmanned vehicle 20 acquired in Step S201 (Step S205). Specifically, as illustrated in FIG. 9, the control target generation section 222 acquires the node ID of the closest node 12-1 among the plurality of nodes 12 included in the traveling section 13-2 (in other words, the next traveling section) ahead of the unmanned vehicle 20 (unmanned vehicle 20-1).

Subsequently, the control target generation section 222 calculates the traveling distance in the traveling section based on the acquired next traveling section node and the position of the unmanned vehicle 20 acquired in Step S201 (Step S206). Specifically, the control target generation section 222 calculates the distance from the position of the unmanned vehicle 20 and the next traveling section node (that is, the node 12-1) as the traveling distance in the traveling section.

Subsequently, the control target generation section 222 determines whether the work content is "standby" (Step S207). When the work content is determined as "standby" and before the reception of the start-up instruction from the loading machine 30, the control target generation section 222 generates a speed target value at which the speed of the unmanned vehicle 20 is maintained at 0 (Step S208). Note that when the work content is determined as "standby" and after the reception of the start-up instruction from the loading machine 30, the control target generation section 222 generates the speed limit corresponding to the next traveling section node as the speed target value.

On the other hand, when the work content is determined as not "standby," the control target generation section 222 generates the speed target value based on the speed of the unmanned vehicle 20 acquired in Step S202 and the traveling distance in the traveling section calculated in Step S206 (Step S209). Specifically, when the preceding vehicle is present in the next traveling section, the control target generation section 222 generates the speed target value at which deceleration to stop is performed such that the speed becomes 0 at the time at which the traveling distance in the traveling section is reached using the relationship between the speed when the speed target value is generated and the time illustrated in FIG. 11. Note that when the preceding vehicle is absent in the next traveling section, the control target generation section 222 generates the speed limit corresponding to the next traveling section node as the speed target value.

In FIG. 11, the horizontal axis indicates the time, and the vertical axis indicates the speed. Additionally, the speed target value is indicated by the solid line, the power generator control speed target value is indicated by the thick dashed line, and the speed limit corresponding to the next traveling section node is indicated by the thin dashed line. In the situation illustrated in FIG. 9, since the preceding vehicle travels in the next traveling section (traveling section 13-2), in accordance with the speed target value indicated by the solid line, the control target generation section 222 generates the speed target value such that the speed gradually decreases and becomes 0 when the traveling distance in the traveling section is reached. Accordingly, the speed of the unmanned vehicle 20 is controlled in accordance with the speed target value.

When Step S208 or S209 ends, the control target generation section 222 generates the power generator control speed target value based on the generated speed target value and the acceleration preparation time acquired in Step S203 (Step S210). Specifically, as indicated by the thick dashed line in FIG. 11, the control target generation section 222 generates the power generator control speed target value at which the unmanned vehicle 20 starts acceleration at the maximum acceleration that can be provided by the unmanned vehicle 20 from the predicted time at which the unmanned vehicle 20 starts acceleration. Further, the control target generation section 222 generates the power generator control speed target value at which acceleration is performed up to the speed limit corresponding to the node ID of the next traveling section node.

Subsequently, the control target generation section 222 calculates a wheel torque based on the generated power generator control speed target value and the map information acquired in Step S200 (Step S211). Specifically, the control target generation section 222 calculates the wheel torque based on the generated power generator control speed target value and the inclination of the feed path 10 included in the map information.

Subsequently, the control target generation section 222 generates the electric generation output target value based on the calculated wheel torque (Step S212). Specifically, the control target generation section 222 generates the electric generation output target value at which sufficient acceleration performance can be provided even when speed control for accelerating the unmanned vehicle 20 is actually performed at the predicted time at which the unmanned vehicle 20 starts acceleration based on the wheel torque and a resistance of the traveling motor.

Subsequently, the control target generation section 222 outputs the speed target value and the electric generation output target value to the autonomous travel control section 223 (Step S213). Thus, a sequence of the processes are terminated.

The autonomous travel control section 223 generates the power generator manipulated variable to drive the power generator to generate electricity during the acceleration preparation time such that the electric generation output target value can be achieved with respect to the electric generation output target value output from the control target generation section 222. For example, the autonomous travel control section 223 provides a stepped power generator manipulated variable at 3T seconds before the time at which the electric generation output target value rises using a time constant T when a response characteristic of the power generator is modeled with a transfer function of the first-order lag. With the transfer function of a first-order lag, the output reaches a value 90% of a steady value after a lapse of 3T seconds from a step input, and therefore the sufficient electric generation output target value can be generated until the predicted time at which the acceleration starts by providing the power generator manipulated variable at 3T seconds before in advance.

In the unmanned vehicle 20 of this embodiment, when the acceleration start of the unmanned vehicle 20 is affected by the work progression of the loading operation to the unmanned vehicle 20 by the loading machine 30 or the work progression of the preceding vehicle, based on the position of the unmanned vehicle 20 verified with the map information set in advance and detected by the position sensor 240 and the speed of the unmanned vehicle 20 detected by the speed sensor 250, the vehicle control device 220 calculates the work progression of the loading operation or the work progression of the preceding vehicle, calculates the acceleration preparation time based on the calculated work progression, and drives the power generator to generate electricity during the calculated acceleration preparation time. Thus, since electric generation time until the electric motor reaches an output where the sufficient acceleration performance can be provided can be ensured, when the unmanned vehicle 20 starts acceleration, start-up or acceleration of the unmanned vehicle 20 can be performed quickly. As a result, improvement in acceleration performance of the unmanned vehicle 20 can be achieved.

[Vehicle Control System]

The following describes an embodiment of the vehicle control system according to the present invention based on FIG. 12. FIG. 12 is a schematic configuration diagram illustrating the vehicle control system according to the embodiment. As illustrated in FIG. 12, a vehicle control system 1 of this embodiment includes a plurality of unmanned vehicles 20A, a plurality of the loading machines 30, a server 50 that manages works of the unmanned vehicles 20A and the loading machines 30. The unmanned vehicles 20A, the loading machines 30, and the server 50 are mutually communicatively connected with the wireless communication line 40 (see FIG. 1).

The unmanned vehicle 20A of this embodiment differs from the above-described unmanned vehicle 20 in that a vehicle control device 220A does not include the acceleration preparation time calculation section 221. On the other hand, the server 50 has an acceleration preparation time calculation function. That is, the vehicle control system 1 of this embodiment is a system in which the function of the above-described acceleration preparation time calculation section 221 of the unmanned vehicle 20 is provided with the server 50.

Specifically, as illustrated in FIG. 12, the vehicle control device 220A in the unmanned vehicle 20A includes the control target generation section 222, the autonomous travel control section 223, and the vehicle body drive section 224. Additionally, the vehicle control device 220A periodically transmits the loaded amount of the unmanned vehicle 20A detected by the loading sensor 230, the position of the unmanned vehicle 20A verified with the map information set in advance and detected by the position sensor 240, the speed of the unmanned vehicle 20A detected by the speed sensor 250, the vehicle-to-vehicle distance of the preceding vehicle detected by the distance sensor 260, and the map information stored in the map information storage section 201 to the server 50 via the wireless communication device 210. Note that the vehicle control device 220A may transmit the respective pieces of information detected by the sensors and the map information to the server 50 only when the server 50 requests it.

The server 50 is, for example, configured by a microcomputer formed by combining a Central Processing Unit (CPU) that executes an operation, a Read Only Memory (ROM) as a secondary storage device recording a program for the operation, and a Random Access Memory (RAM) as a primary storage device storing progress of the operation and a temporal control variable. By executing the stored program, each control regarding, for example, management of the unmanned vehicle 20A and the loading machine 30 is performed.

The server 50 includes a wireless communication device 510 and an acceleration preparation time calculation device 500. The wireless communication device 510 is, for example, a radio for connecting to the wireless communication line 40. The server 50 transmits/receives information to/from the unmanned vehicle 20A or the loading machine 30 via the wireless communication device 510. For example, the server 50 receives each piece of the information transmitted from the unmanned vehicle 20A and each piece of the information transmitted from the loading machine 30 via the wireless communication device 510 and aggregates them. Additionally, the server 50 transmits, for example, an instruction to the unmanned vehicle 20A and an instruction to the loading machine 30 via the wireless communication device 510.

The acceleration preparation time calculation device 500 has a structure and a function similar to those of the above-described acceleration preparation time calculation section 221. That is, similarly to the above-described acceleration preparation time calculation section 221, the acceleration preparation time calculation device 500 calculates the work progression of the loading operation to the unmanned vehicle 20A by the loading machine 30 or the work progression of the preceding vehicle that travels ahead of the unmanned vehicle 20A based on the position of the unmanned vehicle 20A and the speed of the unmanned vehicle 20A. Based on the calculated work progression, the acceleration preparation time calculation device 500 calculates the period from the predicted time at which the work progression exceeds the predetermined proportion until predicted time at which the unmanned vehicle 20A starts acceleration as the acceleration preparation time. The acceleration preparation time calculation device 500 transmits the calculated acceleration preparation time to the control target generation section 222 of the unmanned vehicle 20A via the wireless communication device 510.

The vehicle control system 1 according to this embodiment obtains the operational advantages similar to the above-described unmanned vehicle 20 and also aggregates the information from a plurality of the unmanned vehicles 20A and the loading machines 30, and calculates the acceleration preparation time based on the aggregated information. Accordingly, compared with the case where the acceleration preparation time is calculated based on the information acquired by the unmanned vehicle 20 alone, the calculation accuracy of the acceleration preparation time can be further enhanced.

Note that, in this embodiment, when the work progression of the loading operation to the unmanned vehicle 20A by the loading machine 30 and the acceleration preparation time during standby are calculated, the acceleration preparation time calculation device 500 may use posture information and loading amount information transmitted from the loading machine 30 instead of the loaded amount detected by the loading sensor 230 of the unmanned vehicle 20A, or the posture information and the loading amount information transmitted from the loading machine 30 may be used further in addition to the loaded amount detected by the loading sensor 230 of the unmanned vehicle 20A. In this case, while the loaded amount acquired by the loading sensor 230 of the unmanned vehicle 20A is discrete information, the loaded amount acquired by the sensor of the loading machine 30 is continuous information, and therefore the accuracy of the calculated work progression can be enhanced. As a result, since the acceleration preparation time can be calculated with further high accuracy, the effect of improving acceleration performance can be further enhanced.

Additionally, when the work progression of the preceding vehicle traveling ahead of the unmanned vehicle 20A and the acceleration preparation time during hauling are calculated, the acceleration preparation time calculation device 500 preferably calculates the work progression based on the information detected by the position sensor 240 and the speed sensor 250 of the preceding vehicle instead of the vehicle-to-vehicle distance detected by the distance sensor 260 of the unmanned vehicle 20A. Accordingly, the acceleration preparation time can be further promptly calculated and the electric generation time can be easily ensured, and therefore improvement in acceleration performance can be achieved with more certainty.

While the embodiments of the present invention have been described in detail above, the present invention is not limited thereto, and can be subjected to various kinds of changes in design without departing from the spirit of the present invention described in the claims.

REFERENCE SIGNS LIST

1 Vehicle control system
10 Feed path
11 Travel path
12 Node
13 Traveling section
20, 20A Unmanned vehicle (hauling vehicle)
30 Loading machine
40 Wireless communication line
50 Server
200 Storage device
201 Map information storage section
210 Wireless communication device
220, 220A Vehicle control device
221 Acceleration preparation time calculation section
222 Control target generation section
223 Autonomous travel control section
224 Vehicle body drive section
230 Loading sensor (loaded amount detection device)
240 Position sensor (position detection device)
250 Speed sensor (speed detection device)
260 Distance sensor (distance detection device)
300 Start-up instruction input device
500 Acceleration preparation time calculation device

The invention claimed is:

1. A hauling vehicle that drives an electric motor by electric power generated in a power generator to travel by driving of the electric motor, the hauling vehicle comprising:
a position detection device that detects a position of the hauling vehicle;
a speed detection device that detects a speed of the hauling vehicle; and
a vehicle control device that controls the hauling vehicle based on map information set in advance,
wherein the vehicle control device:
acquires a work content of the hauling vehicle corresponding to either hauling or standby based on the position of the hauling vehicle verified with the map information and detected by the position detection device and the speed of the hauling vehicle detected by the speed detection device, and calculates a work progression of a loading operation to the hauling vehicle by a loading machine or a work progression of a preceding vehicle that travels ahead of the hauling vehicle in accordance with the acquired work content;
calculates a period from a predicted time at which the work progression exceeds a predetermined proportion until a predicted time at which the hauling vehicle starts acceleration based on the calculated work progression as an acceleration preparation time; and
drives the power generator to generate electricity during the acceleration preparation time based on the calculated acceleration preparation time.

2. The hauling vehicle according to claim 1, further comprising
a loaded amount detection device that detects a loaded amount of the hauling vehicle,
wherein the vehicle control device:
estimates a loading operation time until the loading operation to the hauling vehicle by the loading machine is completed based on the loaded amount detected by the loaded amount detection device; and
calculates the work progression of the loading operation based on the estimated loading operation time.

3. The hauling vehicle according to claim 1, further comprising
a distance detection device that detects a distance between the hauling vehicle and the preceding vehicle,
wherein the vehicle control device:
calculates a speed of the preceding vehicle and a traveling section path length of the preceding vehicle based on the distance between the hauling vehicle and the preceding vehicle detected by the distance detection device, the position of the hauling vehicle detected by the position detection device, and the speed of the hauling vehicle detected by the speed detection device; and
calculates the work progression of the preceding vehicle based on the calculated speed of the preceding vehicle and traveling section path length.

4. A vehicle control system comprising:
a hauling vehicle that drives an electric motor by electric power generated in a power generator to travel by driving of the electric motor;
a loading machine that performs a loading operation on the hauling vehicle; and
a server communicatively connected to the hauling vehicle, wherein the hauling vehicle includes:
  a position detection device that detects a position of the hauling vehicle;
  a speed detection device that detects a speed of the hauling vehicle; and
  a vehicle control device that controls the hauling vehicle based on map information set in advance,
wherein the server:
  acquires a work content of the hauling vehicle corresponding to either hauling or standby based on the position of the hauling vehicle verified with the map information and the speed of the hauling vehicle transmitted from the hauling vehicle, and calculates a work progression of a loading operation to the hauling vehicle by the loading machine or a work progression of a preceding vehicle that travels ahead of the hauling vehicle in accordance with the acquired work content; and
  calculates a period from a predicted time at which the work progression exceeds a predetermined proportion until a predicted time at which the hauling vehicle starts acceleration based on the calculated work progression as an acceleration preparation time, and
wherein the vehicle control device of the hauling vehicle drives the power generator to generate electricity during the acceleration preparation time based on the acceleration preparation time calculated in the server.

5. The vehicle control system according to claim 4,
wherein the hauling vehicle further includes a loaded amount detection device that detects a loaded amount of the hauling vehicle, and
wherein the server:
  estimates a loading operation time until the loading operation to the hauling vehicle by the loading machine is completed based on the loaded amount of the hauling vehicle transmitted from the hauling vehicle; and
  calculates the work progression of the loading operation based on the estimated loading operation time.

6. The vehicle control system according to claim 4,
wherein the hauling vehicle further includes a distance detection device that detects a distance between the hauling vehicle and the preceding vehicle, and
wherein the server:
  calculates a speed of the preceding vehicle and a traveling section path length of the preceding vehicle based on the position of the hauling vehicle, the speed of the hauling vehicle, and the distance between the hauling vehicle and the preceding vehicle transmitted from the hauling vehicle; and
  calculates the work progression of the preceding vehicle based on the calculated speed of the preceding vehicle and traveling section path length.

\* \* \* \* \*